United States Patent
Tran et al.

(10) Patent No.: US 7,668,883 B2
(45) Date of Patent: *Feb. 23, 2010

(54) SYSTEM FOR SECURE ERASING OF FILES

(75) Inventors: Peter Tran, Garden Grove, CA (US); Amir Shahindoust, Laguna Niguel, CA (US); Michael Yeung, Mission Viejo, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 97 days.

This patent is subject to a terminal disclaimer.

(21) Appl. No.: 11/336,479

(22) Filed: Jan. 20, 2006

(65) Prior Publication Data

US 2006/0117153 A1    Jun. 1, 2006

Related U.S. Application Data

(63) Continuation-in-part of application No. 11/000,018, filed on Nov. 30, 2004, now Pat. No. 7,246,209.

(51) Int. Cl.
| | |
|---|---|
| G06F 12/00 | (2006.01) |
| G06F 17/30 | (2006.01) |
| G06F 13/00 | (2006.01) |
| G06F 13/28 | (2006.01) |

(52) U.S. Cl. .................................. 707/206; 711/159
(58) Field of Classification Search ........................ None
See application file for complete search history.

(56) References Cited

U.S. PATENT DOCUMENTS

| | | | |
|---|---|---|---|
| 5,958,005 A | | 9/1999 | Thorne et al. |
| 5,991,778 A | * | 11/1999 | Starek et al. ................. 707/205 |
| 6,205,558 B1 | * | 3/2001 | Sobel ........................... 714/15 |
| 6,507,911 B1 | * | 1/2003 | Langford ..................... 713/193 |
| 6,731,447 B2 | | 5/2004 | Bunker et al. |

(Continued)

OTHER PUBLICATIONS

Bauer et al., "Secure Data Deletion for Linux File Systems," USENIX, 2001.*

(Continued)

*Primary Examiner*—Pierre M Vital
*Assistant Examiner*—Rachel J Lee
(74) *Attorney, Agent, or Firm*—Tucker Ellis & West LLP (57) ABSTRACT

The present invention is directed to a system and method for the secure and correct deletion of data files from a data storage that bypasses the file system of an operating system. A secure erase service receives a secure erase request from a system interceptor component, which has intercepted a system call from an application. The system call interceptor component communicates with the secure erase service via an interprocess communication module. The secure erase service receives the secure erase request from the interprocess communication module and communicates the secure erase request to a secure erase library. Using the file information contained in the secure erase request, the secure erase library queries the file system of the data storage device to determine the location of data blocks containing the to be deleted data. Once, the location of the data blocks has been determined, the secure erase library then instructs the device driver, via a virtual file system, to overwrite the data blocks storing the electronic file a predetermined number of times.

18 Claims, 3 Drawing Sheets

U.S. PATENT DOCUMENTS

| | | |
|---|---|---|
| 2002/0078026 A1 | 6/2002 | Fergus |
| 2002/0181134 A1 | 12/2002 | Bunker et al. |
| 2003/0079078 A1 | 4/2003 | Zipprich et al. |
| 2003/0162450 A1 | 8/2003 | Matsuda et al. |
| 2004/0114173 A1 | 6/2004 | Bunker |
| 2004/0114182 A1 | 6/2004 | Davis |
| 2004/0114265 A1 | 6/2004 | Talbert |
| 2006/0021005 A1* | 1/2006 | Williams et al. ............... 726/2 |

OTHER PUBLICATIONS

Joukov et al., "Adding Secure Deletion to Your Favorite File System," IEEE, 2005.*

* cited by examiner

SYSTEM FOR SECURE ERASING OF FILES

The subject application is a continuation-in-part of U.S. patent application Ser. No. 11/000,018 entitled SYSTEM FOR SECURE ERASING OF FILES, filed on Nov. 30, 2004 now U.S. Pat. No. 7,246,209, the content of which is incorporated herein by reference.

BACKGROUND

This invention teaches a system and method for the secure deletion of files on a hard drive. More particularly, this invention is directed to a system and method for securely erasing data files while bypassing the file system of the operating system.

Data security and protection are major issues in the present socio-economic environment. Businesses and individuals need to maintain their privacy in an ever increasing information-based society. Such privacy typically extends to the personal and proprietary files stored on non-volatile storage media, such as computer hard drives. Most operating systems fail to delete a file from the hard drive when instructed to do so by an application or a user. Instead, operating systems remove the link, or address, of the file, while the contents of the electronic data file remain in blocks on the non-volatile storage media. The data remains on the storage media until that area of the media is required for storing some other file. The blocks are only then overwritten with the new data. Until such overwriting, a skilled computer expert can retrieve the deleted data from the non-volatile storage media. Previous attempts have been made to overwrite, or securely delete, the data blocks in the past.

In some operating systems, such as Windows® by Microsoft Corporation, the overwriting tasks are easier than in others, such as Linux, an open-source operating system freely available and widely used. Third-party vendors offer a variety of secure delete applications for the Windows® operating system. Linux, in contrast has relatively few such utilities available. Those utilities that are available have several problems. For example, the utilities typically rely on the underlying file system to write to the non-volatile storage media, resulting in errors in the overwriting of the original data blocks In addition, the utilities require distinct user interaction, i.e., they cannot be initiated automatically by an application. Additionally, operating systems such as the Linux operating system will typically allocate time slices for overwrite operations. Thus, the overwrite operations may be deferred while other tasks are being executed. In an extreme case, application termination or hardware failure may result in an abort of an overwrite procedure, resulting in data still being recoverable.

Thus there is a need for a system and method to securely and correctly erase data files from a data storage that bypasses the file system.

SUMMARY OF INVENTION

In accordance with the present invention, there is provided a system and method for the secure deletion of electronic files.

Further, in accordance with the present invention, there is provided a system and method for securely erasing electronic files from a data storage device.

Further, in accordance with the present invention, there is provided a system and method for securely erasing data files from a data storage while bypassing the file system of an operating system.

Still further, in accordance with the present invention, there is provided a system for the secure erasing of data files while bypassing the file system of an operating system. The system includes means adapted to receive a secure erase signal representative of a desired erasure of a selected electronic file stored in a non-volatile memory and means adapted to communicate data to an associated data storage. The data storage includes means adapted to store data in a selected plurality of data storage segments, means adapted to receive data for storage in the data storage segments, file system means, means adapted to receive a tracking data query representative of tracking data associated with the selected electronic file, and means adapted to output tracking data associated with the selected electronic file in accordance with the received tracking data query. The file system means includes means for storing tracking data representative of at least one data storage segment which is used to store data associated with each of a plurality of data records. The system further includes means adapted to communicate a tracking data query to the data storage in accordance with a received, secure erase signal, means adapted to receive tracking data representative of each data segment from the file system means, and secure erase initiation means adapted for initiating a high-priority data write operation of selected overwrite data to each data storage segment associated with the selected electronic file.

Still further, in accordance with the present invention, there is provided a method for securing erasing of data files while bypassing the file system. A secure erase signal, representing a desired erasure of a selected electronic file stored in a non-volatile memory, is received. The method then communicates data to an associated data storage, which is received by the data storage and stored the data in a selected plurality of data storage segments. Tracking data, representing at least one data storage segment, is stored using a file system, which stores data associated with the selected electronic data file. The tracking data associated with the selected electronic data file is then output according to a received tracking data query. The tracking data query is communicated to the data storage according to the received secure erase signal. The tracking data representing each data segment from the file system is received and a high-priority data write operation of selected overwrite data to each data storage segment associated with the selected electronic file is initiated.

Still other objects and aspects of the present invention will become readily apparent to those skilled in this art from the following description wherein there is shown and described a preferred embodiment of this invention, simply by way of illustration of one of the best modes suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE DRAWINGS

The subject invention is described with reference to certain parts, and arrangements to parts, which are evidenced in conjunction with the associated drawings, which form a part hereof and not, for the purposes of limiting the same in which.

DETAILED DESCRIPTION OF THE PREFERRED EMBODIMENTS

This invention is directed to a system and method for securely erasing electronic files from a data storage device. More particularly, this invention provides a system and method for securely erasing data files from a data storage while bypassing the file system an operating system. The system and method enable the secure deletion of electronic files from an associated data storage directly from an application and from a system interceptor component, while bypassing the file system.

Figure 1:
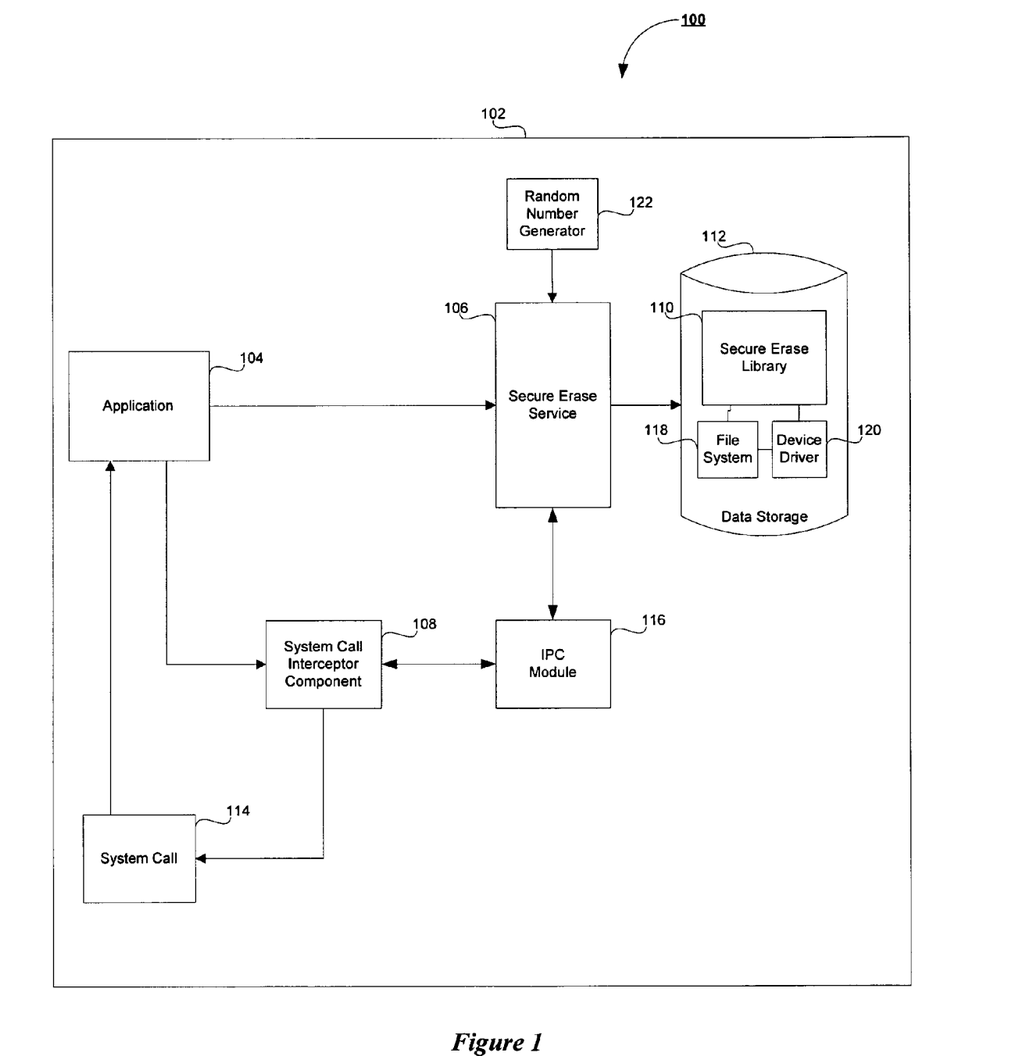
FIG. 1 is a block diagram illustrative of the system of the present invention.

FIG. 1 illustrates a block diagram preferred embodiment of the system according to the present invention generally designated as 100. As shown in FIG. 1, the system 100 includes a Linux-based device 102, such as a personal computer, a server, a printer-controller, an image-generating device, a multifunction peripheral device and the like. As will be understood by those skilled in the art, Linux refers to an operating system that is an implementation of the Unix kernel containing no proprietary code. While the preferred embodiment is directed to a Linux operating system environment, it will be appreciated by one of ordinary skill in the art that the subject teachings are suitably applied in any operating system having the shortcomings noted above. Resident on the Linux-based device 102 is an application 104, or other complete, self-contained program that performs a specific function directly for a user. In the preferred embodiment, the application 104 resides on the Linux-based device 102. The skilled artisan will appreciate that the application 104 is, for example, and without limitation, a word-processing program, a spreadsheet editor, and a text formatter. In a preferred embodiment, the application 104 receives user input via a graphical user-interface.

The system 100 also includes a secure erase service 106, equipped to communicate with the application 104 directly, or indirectly via a system call interceptor component 108. The secure erase service 106 is in data communication with a secure erase library 110, located on an associated data storage device 112. The secure erase library maintains tracking data on the location of the data blocks that store an electronic data file. As will be appreciated by those skilled in the art, the data storage device 112 is capable of being implemented as the hard drive component of the Linux-based device 102, or another form of magnetic, optical or other non-volatile memory associated with the Linux-based device 102. When the application 104 is capable of directly communicating with the secure erase service 106, i.e., the application has administrative authority on the Linux-based device 102, there is no need to issue a system call 114.

The application 104 issues a secure erase request directly to the secure erase service 106. The secure erase service 106 processes the request and communicates the request to the secure erase library 110 to determine the data blocks on the data storage device 112 containing the data to be deleted. The secure erase library 110 queries the file system 118 of the data storage device 112 to determine the location of data blocks containing the selected data. Once, the location of the data blocks has been determined, the secure erase library 110 then instructs the device driver 120 of the data storage device 112 to overwrite those data blocks containing the data to be deleted a predetermined number of times.

In a preferred embodiment, the system also includes a random number generator 122 for generating random numbers to be used in the overwriting of data blocks containing data to be deleted. The random number generator is suitably either externally or internally coupled to the secure erase service 106. As will be appreciated by one of ordinary skill in the art, conventional random generators typically require that a starting value or seed be input. The seed value allows for generation of a string of random numbers. If a specific generator is used, the same string of random numbers will be generated each time operation is commenced with a specified seed value. The string of random numbers is communicated to the device driver 120 wherein the string of random numbers is used to overwrite the data blocks containing the data to be deleted. In the event, the data blocks are to be overwritten a plurality of times, the random number generator will suitably generate a number of strings of random numbers corresponding to the number of times the data blocks are to be overwritten.

Indirect data communication between the application 104 and the secure erase service 106 is accomplished using the system call 114. As will be understood by those skilled in the art, the system call 114 is any mechanism, known in the art, used by an application program to request service from an operating system. The skilled artisan will appreciate that use of the system call 114 in the present invention enables a user, lacking administrative or supervisory authority, to cause the processor to change operating modes to a supervisor mode, thereby allowing the operating system to perform restricted actions, i.e., accessing hardware devices or a memory management unit.

When the application 104 initiates a system call 114 to erase an electronic data file stored on the associated data storage device 112, the system call 114 is intercepted by the system call interceptor component 108. The system call interceptor component 108 then communicates with the secure erase service 106 via an interprocess communication module 116. The interprocess communication module 116 of the present invention is an interprocess communication mechanism known in the art capable of facilitating the exchange of data between one process and another, either within the same computer, as shown in FIG. 1, or over a network, such as the Linux-based device 102 and an external Linux-based peripheral device (not shown).

The secure erase service 106 receives the secure erase request from the interprocess communication module 116 and communicates the secure erase request to the secure erase library 110. Using the file information contained in the secure erase request, the secure erase library 110 queries the file system 118 of the data storage device 112 to determine the location of data blocks containing the to be deleted data. Once, the location of the data blocks has been determined, the secure erase library 110 then instructs the device driver 120 of the data storage device 112 to overwrite the data blocks storing the electronic file a predetermined number of times.

Figure 2:
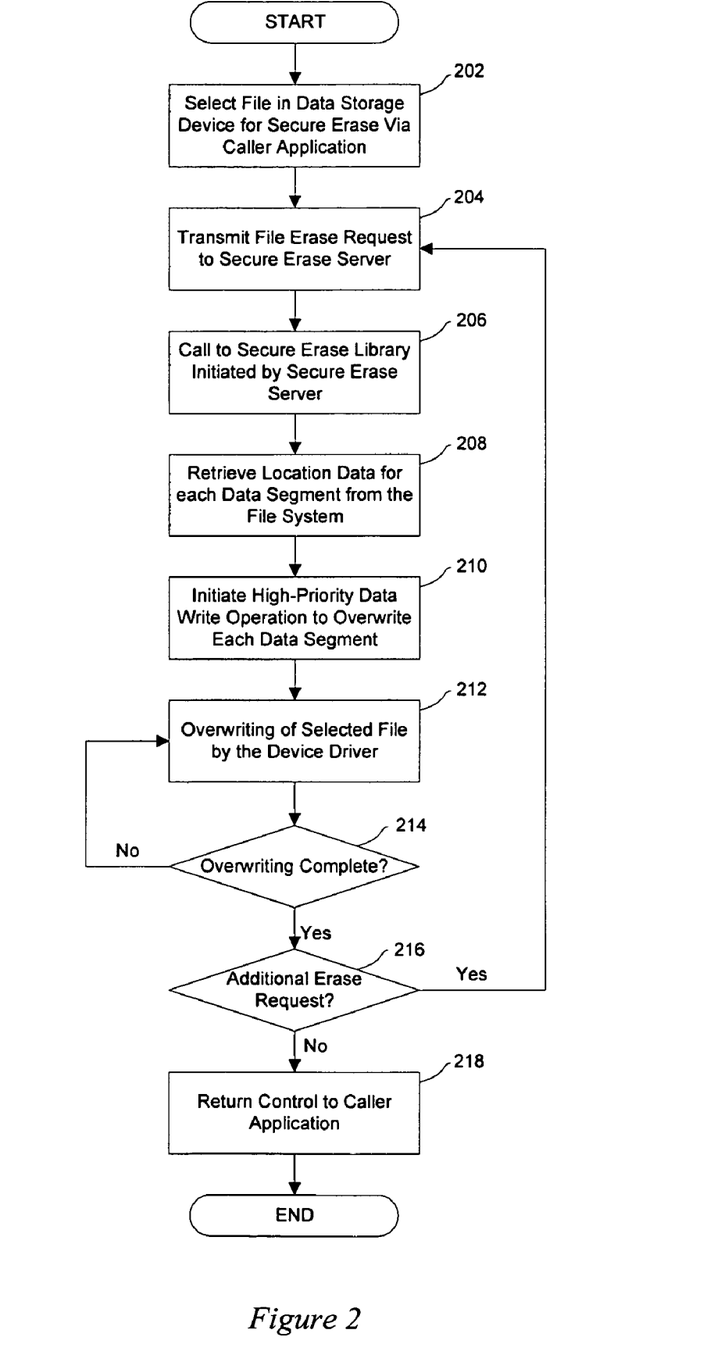
FIG. 2 is a flowchart illustrating the application direct secure erase process according to the present invention.

Turning now to FIG. 2, there is shown a flowchart illustrating the direct initiation of a secure delete operation by the application 104 having supervisory authority. Beginning at step 202, the user selects a file stored in the data storage device for secure erase using a caller application. At step 204, the application transmits a file erase request to the secure erase service to erase the file selected at step 202 from the data storage device. The file erase request prompts the secure erase service to call the secure erase library at step 206. The secure erase library maintains data indicating the location of the electronic file to be erased. At step 208, the secure erase library retrieves the location data for each data segment, or data block, corresponding to the selected file, from the file system. A high-priority data write operation is initiated at step 210 to overwrite each data segment identified by the secure erase library as containing data corresponding to the selected file.

The selected file is then overwritten using the device driver of the storage device at step 212. In a preferred embodiment, the data overwrite operation is performed using a string of random numbers generated by the random number generator and communicated to the device driver for overwriting thereof. The subject invention enables the bypassing of the file system by communicating with the device driver using a virtual file system. Thus, the system provides a controllable and prioritized mechanism to accomplish data overwriting. As will be understood by those skilled in the art, the virtual file system allows direct access to the device driver via open/read/write with, for example, /dev/hdx as a file name. In addition, the bypassing of the file system through the device driver enables the immediate overwrite of the selected file, instead of waiting for the file system to optimize by buffer and schedule the read/write operation. Furthermore, the skilled artisan will appreciate that the file system typically is optimized such that only the last of the predetermined number of rewrites occurs. In accordance with the subject invention, the use of the device driver allows the completion of the predetermined number of rewrites without the file system interfering.

At step 214, a determination is made that the overwriting is not complete, i.e., that the predetermined number of overwrites has not occurred. In such an event, the system returns to step 212 to overwrite the selected file using the device driver. When the overwriting of the selected file is determined to be complete at step 214, the system proceeds to determine, at step 216, that the secure erase service has received an additional secure erase request from the caller application. When the secure erase service has received an additional erase request, the system returns to step 206, wherein the secure erase library is called. When there are no additional secure erase requests at step 216, the system returns control to the caller application at step 218.

Figure 3:
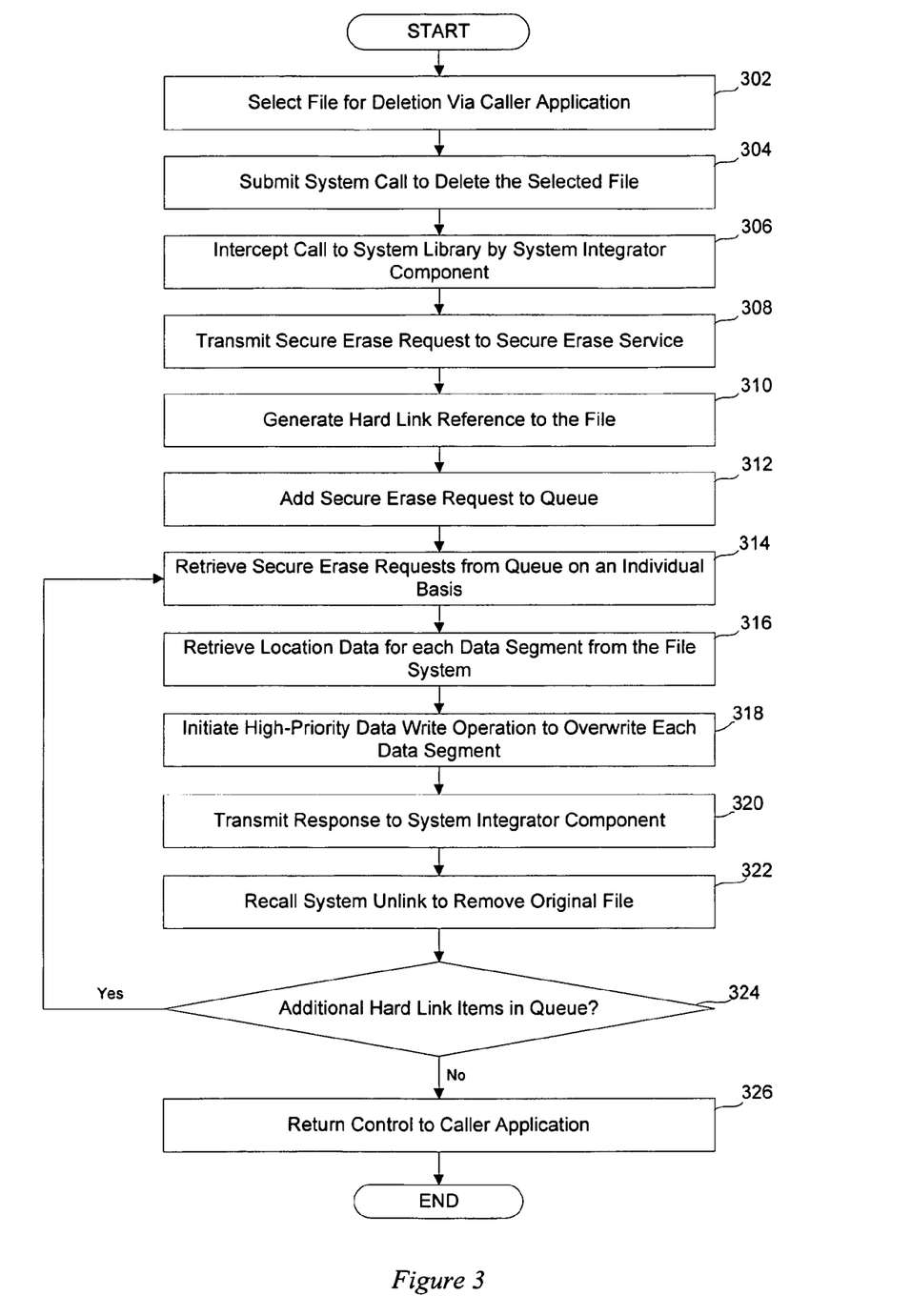
FIG. 3 is a flowchart illustrating the secure erase process using the system integrator component according to the present invention.

Referring now to FIG. 3, there is shown a flowchart illustrating the automatic, or programmatic, secure deletion of a selected electronic file. Beginning at step 302, a user selects a file for deletion via a caller application. It will be understood by those skilled in the art that the user is merely selecting a file for deletion, not necessarily requiring the secure deletion of a file. The subject invention enables a system administrator to designate certain applications that automatically securely delete files, while other applications use the general file erase procedure. The application then submits a system call to delete the selected file at step 304. The skilled artisan will appreciate that the delete request of the system call, in the Linux operating system, is implemented as an unlink request transmitted from the kernel module. Unlink is an API used in the Linux operating system to request removal of any symbolic link to a file. unlink guarantees that the space taken up by a file cannot be freed until all the hard links, e.g., pathnames for the same file within the same file system, have been removed.

The system call submitted at step 304 is then intercepted by a system interceptor component at step 306. The skilled artisan will appreciate that due to the user being unaware of the secure deletion of the selected file, the system employs the interceptor to retrieve the user's selection for secure erasure. The system interceptor component then transmits a secure erase request, corresponding to the system call, to the secure erase service at step 308. At step 310, the secure erase service generates a hard link reference to the selected file. As will be understood by those skilled in the art, the hard link reference generated by the secure erase service is a directory entry that relates a pathname to an inode, which contains all the information about the file, within the same file system.

The hard link representing the file of the secure erase request is entered into a secure erase queue at step 312. The secure erase requests are then retrieved from the queue on a one-at-a-time basis at step 314. That is, the secure erase service retrieves the hard link, or pathname, of the file to be securely erased. Location data for each data segment, or block, of the selected file is then retrieved from the file system using the hard link at step 316. Advantageously, an application program interface within the secure erase library is used to securely erase the selected file by using the hard link to locate the data segments and the device driver to overwrite the data segments. An immediate, or high-priority, data write operation is then initiated at step 318 to overwrite each data segment a predetermined number of times. As will be understood by those skilled in the art, the overwrite operation is suitably accomplished using the virtual file system, enabling the device drivers to overwrite the data blocks and bypass the file system used on the storage device. In a preferred embodiment, the data overwrite operation is performed using a string of random numbers generated by the random number generator and communicated to the device driver for overwriting thereof.

Upon completion of the high-priority data write operation at step 318, a response is transmitted to the system interceptor component at step 320 to inform the component that the overwrite has occurred. The system interceptor component then recalls the system unlink request at step 322, i.e., the original delete request from the user, to remove the original file. A determination is made at step 324 that no additional hard link items remain in the queue. Upon such a determination, control is returned to the caller application at step 326. When the determination made at step 324 indicates that other hard link items remain in the queue, the system returns to step 314, wherein the next hard link item is retrieved from the queue and proceeds through the remaining steps. The process repeats for each individual item in the queue until the queue is empty and control is returned to the caller application at step 326.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. A system for secure erasing of data files while bypassing the file system of an operating system comprising:
    a processor and memory for storing instructions associated therewith;
    a data storage device for storing at least one electronic file thereon, wherein the data storage device is comprised of nonvolatile memory;
    means for receiving an erase signal from a first application directed to the file system of the operating system, the erase signal being representative of a desired erasure of a selected electronic file stored in the data storage device;
    means for intercepting the erase signal to commence a secure erase procedure in accordance with a secure erase application;
    means for communicating data to the data storage device, the data storage device including:
        means for storing the data in a selected plurality of data storage segments,
        means for receiving the data for storage in the data storage segments,
        file system means, the file system means including means for storing tracking data representative of at least one of the data storage segments which is used to store data associated with each of a plurality of data records,
        means for receiving a tracking data query representative of the tracking data associated with the selected electronic file, and
        means for outputting the tracking data associated with the selected electronic file in accordance with the received tracking data query;
    means for communicating the tracking data query to the data storage device in accordance with the received erase signal;
    means for receiving the tracking data representative of a specific physical location within the nonvolatile memory of each data segment from the file system means;
    means for receiving randomly generated overwrite data;
    secure erase initiation means for initiating a high-priority data write operation by the secure erase application of the specific physical location within the nonvolatile memory with the overwrite data to each data storage segment associated with the selected electronic file in accordance with the tracking data; and
    means for communicating a signal representative of a completion of an overwrite operation to the first application so as to commence a delete operation, subsequent to the overwrite operation, by the file system of the operating system as to each overwritten data storage segment.

2. The system for secure erasing of data files while bypassing the file system of an operating system of claim 1 further comprising means for completing a selected number of overwrites to each data storage segment associated with the selected electronic file using the randomly generated overwrite data.

3. The system for secure erasing of data files while bypassing the file system of claim 1 wherein the data storage is further comprised of a magnetic data storage medium.

4. The system for secure erasing of data files while bypassing the file system of claim 3 wherein the data storage is further comprised of a hard disk.

5. The system for secure erasing of data files while bypassing the file system of claim 4, further comprising:
    means for obtaining program control from an associated, calling process upon receipt of the erase signal; and
    means for releasing the program control after completion of the high-priority data write operation initiated by the secure erase initiation means.

6. The system for secure erasing of data files while bypassing the file system of claim 5 wherein the associated operating system is Linux, and wherein the tracking data is contained in a Linux virtual file system.

7. A method for securing erasing of data files while bypassing the file system of an operating system, the method comprising the steps of:
    receiving an erase signal from a first application directed to the file system of the operating system, the erase signal being representative of a desired erasure of a selected electronic file stored in an associated data storage device, wherein the data storage device is comprised of nonvolatile memory;
    intercepting the erase signal to commence a secure erase procedure in accordance with a secure erase application;
    communicating data to the associated data storage device;
    storing, in the data storage, the data in a selected plurality of data storage segments,
    storing, via a file system in the data storage, tracking data representative of at least one of the data storage segments which is used to store data associated with each of a plurality of data records;
    communicating a tracking data query representative of the tracking data associated with the selected electronic file to the data storage in accordance with the received erase signal;
    receiving the tracking data representative of a specific physical location within the nonvolatile memory of each data segment from the file system;
    receiving randomly generated overwrite data;
    initiating a high-priority data write operation by the secure erase application of the specific physical location within the nonvolatile memory with the overwrite data to each data storage segment associated with the selected electronic file in accordance with the tracking data; and
    communicating a signal representative of a completion of an overwrite operation to the file system so as to commence a delete operation, subsequent to the overwrite operation, by the file system of the operating system as to each overwritten data storage segment.

8. The method for secure erasing of data files while bypassing the file system of an operating system of claim 7 further comprising the step of completing a selected number of overwrites to each data storage segment associated with the selected electronic file using the randomly generated overwrite data.

9. The method for secure erasing of data files while bypassing the file system of claim 7 wherein the associated data storage is further comprised of a magnetic data storage medium.

10. The method for secure erasing of data files while bypassing the file system of claim 9 wherein the data storage is further comprised of a hard disk.

11. The method for secure erasing of data files while bypassing the file system of claim 10 further comprising the steps of:
obtaining program control from an associated calling process upon receipt of the erase signal; and
releasing the program control after completion of the high-priority data write operation.

12. The method for secure erasing of data files while bypassing the file system on an operating system of claim 11 wherein the associated operating system is Linux, and wherein the tracking data is contained in a Linux virtual file system.

13. A computer-implemented method for securing erasing of data files while bypassing the file system of an operating system, the computer-implemented method comprising the steps of:
receiving an erase signal from a first application directed to the file system of the operating system, the erase signal being representative of a desired erasure of a selected electronic file stored in an associated data storage device, wherein the data storage device is comprised of nonvolatile memory;
intercepting the erase signal to commence a secure erase procedure in accordance with a secure erase application;
communicating data to the associated data storage device;
storing, in the data storage, the data in a selected plurality of data storage segments,
storing, via a file system in the data storage, tracking data representative of at least one of the data storage segments which is used to store data associated with each of a plurality of data records;
communicating a tracking data query representative of the tracking data associated with the selected electronic file to the data storage in accordance with the received erase signal;
receiving the tracking data representative of a specific physical location within the nonvolatile memory of each data segment from the file system;
receiving randomly generated overwrite data;
initiating a high-priority data write operation by the secure erase application of the specific physical location within the nonvolatile memory with the overwrite data to each data storage segment associated with the selected electronic file in accordance with the tracking data; and
communicating a signal representative of a completion of an overwrite operation to the file system so as to commence a delete operation, subsequent to the overwrite operation, by the file system of the operating system as to each overwritten data storage segment.

14. The computer-implemented method for secure erasing of data files while bypassing the file system of an operating system of claim 13 further comprising the step of completing a selected number of overwrites to each data storage segment associated with the selected electronic file using the randomly generated overwrite data.

15. The computer-implemented method for secure erasing of data files while bypassing the file system of claim 13 wherein the associated data storage is further comprised of a magnetic data storage medium.

16. The computer-implemented method for secure erasing of data files while bypassing the file system of claim 15 wherein the associated data storage is further comprised of a hard disk.

17. The computer-implemented method for secure erasing of data files while bypassing the file system of claim 16, further comprising the steps of:
obtaining program control from an associated calling process upon receipt of the erase signal; and
releasing the program control after completion of the high-priority data write operation.

18. The computer-implemented method for secure erasing of data files while bypassing the file system of claim 17 wherein the associated operating system is Linux, and wherein the tracking data is contained in a Linux virtual file system.

* * * * *

UNITED STATES PATENT AND TRADEMARK OFFICE
CERTIFICATE OF CORRECTION

| | |
|---|---|
| PATENT NO. | : 7,668,883 B2 |
| APPLICATION NO. | : 11/336479 |
| DATED | : February 23, 2010 |
| INVENTOR(S) | : Tran et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 290 days.

Signed and Sealed this

Twenty-eighth Day of December, 2010

David J. Kappos
*Director of the United States Patent and Trademark Office*